United States Patent [19]

King

[11] 4,213,636
[45] Jul. 22, 1980

[54] SAFETY BARRIER FOR A VEHICLE

[76] Inventor: William B. King, 5024 Buchanan St., Hollywood, Fla. 33021

[21] Appl. No.: 943,459

[22] Filed: Sep. 18, 1978

[51] Int. Cl.² .............................................. B60R 21/10
[52] U.S. Cl. ........................................ 280/749; 49/9
[58] Field of Search ................... 280/749, 748, 179 B, 280/179 R, 179 A; 296/24 R, 24 C; 244/118 R; 105/493, 495, 376; 49/9, 50

[56] References Cited

U.S. PATENT DOCUMENTS

| 2,586,063 | 2/1952 | Kurtz | 280/749 |
| 3,044,800 | 7/1962 | Wicker | 280/748 |
| 3,049,373 | 8/1962 | Biggers | 296/24 R |
| 3,169,781 | 2/1965 | Abruzzino | 280/749 |
| 3,172,702 | 3/1965 | Rose | 280/749 |
| 3,190,686 | 6/1965 | Smiler | 280/748 |
| 3,525,535 | 8/1970 | Kobori | 280/749 |
| 3,643,972 | 2/1972 | Cainti et al. | 280/749 |
| 3,889,970 | 6/1975 | Astheimer | 280/748 |
| 3,909,038 | 9/1975 | McDonnell | 280/749 |
| 3,930,680 | 1/1976 | Littlefield | 296/10 |
| 3,934,926 | 1/1976 | Bennett | 296/35 A |
| 3,981,530 | 9/1976 | Yamanaka et al. | 296/35 R |
| 4,043,583 | 8/1977 | Tidwell | 296/28 M |

FOREIGN PATENT DOCUMENTS 2448527 4/1976 Fed. Rep. of Germany ........... 280/749

Primary Examiner—David M. Mitchell
Attorney, Agent, or Firm—Stevens, Davis, Miller & Mosher

[57] ABSTRACT

A barrier for separating the passenger compartment of a vehicle from the compartment occupied by the vehicle operator. This barrier is comprised of a stiffly flexible, firm but not hard, frame made of a material such as polyvinyl chloride tubing, the size of the frame being expandable to allow for press fit installation. The frame is traversed by flexible bands which perform the barrier function.

5 Claims, 3 Drawing Figures

SAFETY BARRIER FOR A VEHICLE

This invention relates to safety barriers and more particularly to barriers which are suitable for separating an operating compartment of a vehicle from the passenger compartment thereof.

In most buses, campers and vans and in some aircraft, the interior space alotted to the passengers and that alotted to the driver or crew freely intercommunicate so that, in case of sudden deceleration, standing passengers can be thrown forward into the crew space which may be a source of accident or injury. Various barriers intended to prevent this problem are known to the art but have drawbacks which limit their acceptance. One problem is that the barrier itself may be so rigid in structure or so rigidly fixed in position as to contribute to the very dangers of injury which it is intended to relieve. Futhermore, a rigidly fixed barrier may cause the crew to be encaged so that escape is difficult in case of accident.

The present invention overcomes these difficulties and provides a barrier which is strong, light in weight and rigid enough to perform the barrier funtion but flexible enough to permit easy release of the crew in case of need. A hinged center door may be added as needed to aid ease of escape.

Futhermore, as a matter of both economy and saftey, the barrier of the present invention has an expandable periphery whereby it may be held in position by a simple compression fit. Side arms or front arms may be added as needed for support.

Other objects and advantages of the invention will be apparent upon review of the following detailed description of a preferred embodiment thereof in conjunction with the annexed drawings wherein.

Figure 1:
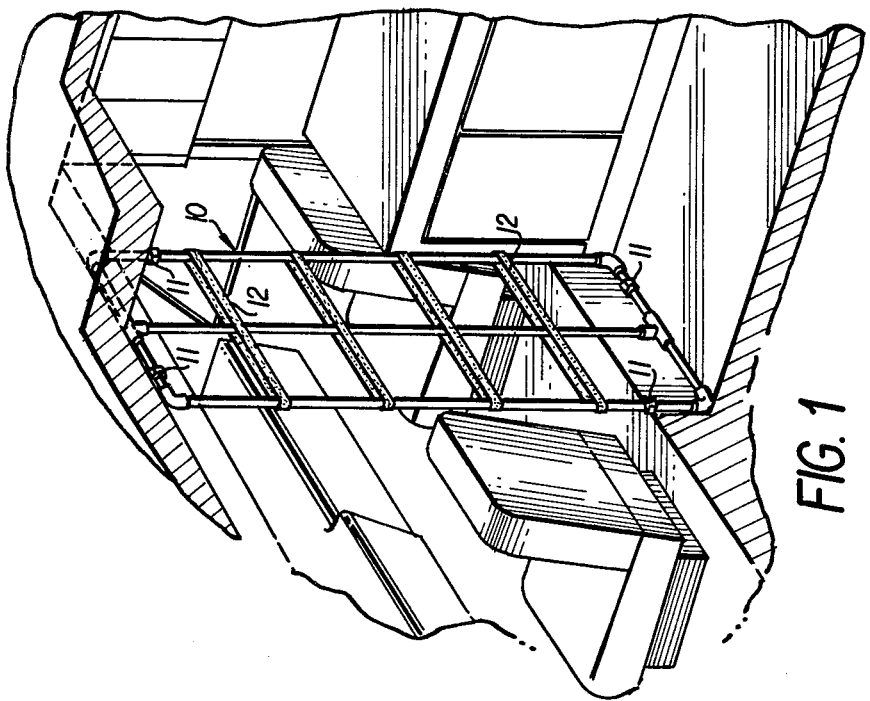
FIG. 1 shows a barrier according to the present invention installed in the front of a vehicle such as a camper or bus and serving to separate the passenger and crew compartments.
Figure 2:
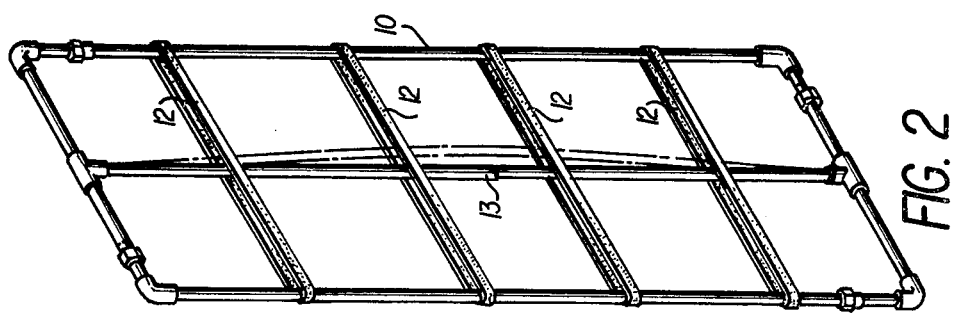
FIG. 2 is a fragmentary view of the barrier of the present invention drawn to an enlarged scale and showing means for expanding the periphery to permit interference fit installation.

Referring now to the drawings in greater detail and more particularly to FIGS. 1 and 2 thereof, the unit shown is comprised of an outer frame 10 defining the (rectangular, or any other suitable shapes,) periphery of the barrier. This frame is rigid without being unduly hard, polyvinyl chloride pipe being suitable material of construction. In each of the four sides of the frame 10, there is a union 11 so that all four lengths of pipe may be extended or contracted to a degree sufficient to make the frame 10 of a dimension suitable to be held in position by a press fit, see FIG. 1. Extending across the space defined by the frame 10 are endless elastic bands 12 which pass around the frame and are held extended by it. Note in FIG. 2 that four of these are shown. If the area encompassed by the frame 10 is sufficiently large, a central vertical dividing tube 13 may be provided suitably chosen from a length of polyvinyl chloride tubing.

It has been found that electrical polyvinyl chloride tubing of 1½" diameter is suitable for the frame 10. The center piece 13 may be made of the same material but of 1" diameter. While it is desirable to be able to extend the frame to accommodate a range of vehicles, it is apparent that the frame may be custom made to size and press fit in position without requiring adjustments.

It can be seen that because there is some flexibility to the polyvinyl chloride pipe and because the bands 12 are elastic, made of heavy rubber or the like, about such as that used for inner tubes, the barrier, while protecting passengers from falling or being projected into the driving or crew compartment does not have sufficient rigidity to keep the crew or driver from escaping easily in case of accident. Note the broken line position of tube 13 in FIG. 2. This position is easily produced should one need to escape the driving compartment. Further flexibility can be achieved by substituting a telescoping tube for the tube 13. Indeed instead of unions 11 which are threaded and function to extend and retract the pipe sections much in the manner of turn buckles, it is possible to make the frame of telescoping sections which can be extended manually or by tools to a press fit position and thereafter held in that position by set screws.

Figure 3:
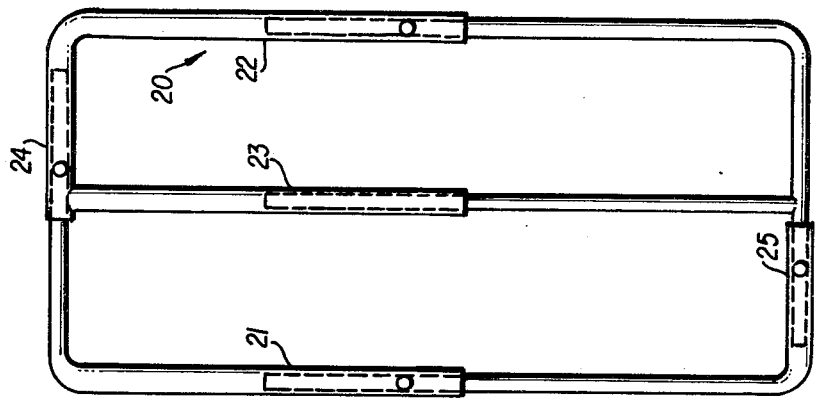
FIG. 3 is a view similar to FIG. 2 but showing a frame of telescoping sections which can be locked in position, the resilient bands which form the barrier being removed better to show the telescoping construction.

This type of construction is shown in FIG. 3 where each element of the frame 20 is made of a telescoping section. Sections or lengths of tubing 21, 22, 23 define the vertical runs of the frame and lengths of tubing 24, and 25 define the horizontal runs thereof. Once the frame lengths or elements 21–25 are adjusted to cause the frame to assume the appropriate size for a press fit, set screws 26 may be tightened to hold the frame in the dimension required.

In FIG. 3 the bands are used just as in FIG. 2, their omission from FIG. 3 being solely so that the telescoping structure would be easier to see. As in FIG. 2, the center frame element 23 may be solid or telescope freely. It is not provided with a set screw so as to be flexible for crew release and to offer a degree of lost motion to decelerate a passenger thrown thereagainst.

While electrical polyvinyl chloride is a suitable material being fire resistant and flexible, other materials of the required physical properties may be used such as cast nylon, lexan, polycarbonate, acrylics, reinforced rubber or neoprene.

A principal advantage of the present invention is that it is either wedge or press fit into position not requiring all the costly and inconvenient attaching devices which characterize the prior art. While manual engagement of the barrier in position is preferred, engine vacuum could be used to provide a means of securing the apparatus in places which would automatically release by a mercury switch after the speed comes to zero or the engine stops; (i.e., as the pulling force ceases or the engine stops, it would deactivate a solenoid or vacuum used in the anchor).

What is claimed is:

1. A safety barrier for preventing passengers from being projected to a forward compartment in vehicle from an aisle thereof, said barrier comprising a frame element of appropriate shape and dimension to extend from the ceiling to the floor and across the width of the aisle in the vehicle and a plurality of horizontally extending endless elastic bands extending across the frame and being spaced vertically apart to prevent a standing passenger from being projected into the forward compartment but to allow the passenger to climb therethrough.

2. The barrier of claim 1, wherein a plastic tubing connected to two sides of the frame and extending in parallel to the two other sides of the frame is provided in the frame element.

3. The barrier of claim 1, wherein the frame is made of a stiffly flexible material.

4. A safety barrier for preventing passengers from being projected into the forward compartment in a vehicle from an aisle thereof, said barrier comprising a rectangular frame element made of plastic tubing, the frame being of appropriate dimension to extend from the ceiling to the floor and across the width of the aisle in the vehicle and having provided therein a plastic tubing connected to two sides of the frame and extending in parallel to the two other sides of the frame; and a plurality of horizontally extending endless elastic bands extending across the frame and being spaced vertically apart to prevent a standing passenger from being projected into the forward compartment but to allow the passenger to climb therethrough.

5. The barrier of claim 1 or 4, wherein the frame element is provided with means to vary the length of the periphery of the frame whereby to effect the press fit installation thereof in the vehicle.

* * * * *